(12) United States Patent
Park et al.

(10) Patent No.: US 8,257,871 B2
(45) Date of Patent: Sep. 4, 2012

(54) ELECTROLYTE FOR LITHIUM SECONDARY BATTERY AND LITHIUM SECONDARY BATTERY INCLUDING THE SAME

(75) Inventors: Na-Rae Park, Suwon-si (KR); Jin-Bum Kim, Suwon-si (KR); Jin-Sung Kim, Suwon-si (KR); Yong-Shik Kim, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1328 days.

(21) Appl. No.: 11/984,304

(22) Filed: Nov. 15, 2007

(65) Prior Publication Data

US 2008/0131785 A1 Jun. 5, 2008

(30) Foreign Application Priority Data

Nov. 30, 2006 (KR) .................. 10-2006-0119900

(51) Int. Cl.
*H01M 6/16* (2006.01)
(52) U.S. Cl. .............. 429/339; 429/231.5; 429/330; 252/62.2
(58) Field of Classification Search .......... 429/339, 429/231.95, 330; 252/62.2
See application file for complete search history.

(56) References Cited

U.S. PATENT DOCUMENTS 7,718,322 B2 * 5/2010 Lee et al. ................ 429/339
2004/0013946 A1 * 1/2004 Abe et al. ................ 429/339

FOREIGN PATENT DOCUMENTS

| JP | 2004-111349 | 4/2004 |
|---|---|---|
| KR | 10-2004-0005954 | 1/2004 |
| KR | 10-2005-0020067 | 3/2005 |
| KR | 10-2005-0078443 | 8/2005 |

OTHER PUBLICATIONS

*The Notice of Allowance* from the Korean Intellectual Property Office issued in Applicant's corresponding Korean Patent Application No. 10-2006-0119900 dated Jan. 28, 2008.
*Office action* from the Korean Intellectual Property Office issued in Applicant's corresponding Korean Patent Application No. 2006-0119900 dated Sep. 21, 2007.

* cited by examiner

*Primary Examiner* — Laura Weiner
(74) *Attorney, Agent, or Firm* — Robert E. Bushnell Esq.

(57) ABSTRACT

An electrolyte for a lithium secondary battery, and a lithium secondary battery including the same are provided. The electrolyte includes: a cyclic ester; an organic solvent including a nitrile-containing solvent represented by Formula 1 at a content ranging from 1 to 5% by volume; and a lithium salt, $$R\text{---}C\equiv N \qquad (1)$$

wherein R is selected from the group consisting of a $C_1$ to $C_{10}$ aliphatic hydrocarbon, a $C_1$ to $C_{10}$ halogenated aliphatic hydrocarbon, a $C_6$ to $C_{10}$ aromatic hydrocarbon, and a $C_6$ to $C_{10}$ halogenated aromatic hydrocarbon. The electrolyte can improve swelling characteristics and discharge capacity characteristics at a low temperature, and realize equal or better performance in characteristics such as capacity, life span and the like, as compared to a conventional carbonate-containing electrolyte.

24 Claims, No Drawings ized aromatic hydrocarbon.
ELECTROLYTE FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This application claims the benefit of Korean Patent Application No. 2006-119900, filed Nov. 30, 2006, the disclosure of which is hereby incorporated herein by reference in its entirety.

BACKGROUND OF THE INVENTION

1. Field of the Invention

The present invention relates to an electrolyte for a lithium secondary battery and a lithium secondary battery including the same, and more particularly, to an electrolyte for a lithium secondary battery and a lithium secondary battery including the same which has excellent swelling characteristics and discharge capacity at a low temperature.

2. Description of the Related Art

With recent developments in the high-tech electronic industry, electronic appliances can be smaller in size and more lightweight, and thus the use of portable electronic devices is increasing. Due to the rising demand for batteries with high energy density to power such portable electronic devices, research on lithium secondary batteries has progressed. Lithium-transition metal oxide is used as a positive electrode active material, and carbon (crystalline or amorphous) or a carbon complex is used as a negative electrode active material. The active material is applied to a current collector to a predetermined thickness and length, or formed in a film shape to be wound with a separator, which is an insulator, or stacked, so as to form a battery. Subsequently, this is put into a metal can or a similar reservoir and an electrolyte is injected thereinto, and thus a rectangular box-shaped secondary battery is produced.

The electrolyte includes a lithium salt and an organic solvent. As the organic solvent, solvents of two to five-component systems, which are comprised of cyclic carbonate such as ethylene carbonate or propylene carbonate, and linear carbonate such as dimethyl carbonate, ethyl methyl carbonate or diethyl carbonate, has been used. However, these solvents have a problem in which a swelling phenomenon excessively occurs at a high temperature. The swelling phenomenon refers to a phenomenon in which the center of a specific surface is transformed, for example, a battery is swollen in a specific direction due to a gas generated by decomposition of an electrolyte in the battery at a high temperature. This swelling phenomenon still creates a problem in a lithium polymer battery, although not as severe compared to a lithium ion battery, when a nickel-containing active material (for example, $LiNiMO_2$, M=Co, Mn, Al, P, Fe, and Mg, and comprised of at least one of the aforementioned elements) is used as a positive electrode active material.

Recently, there have been many trials on a solvent using γ-butyrolactone having a high boiling point and a high dielectric constant to suppress the swelling phenomenon.

Here, the solvent including γ-butyrolactone has been commonly mixed with ethylene carbonate, however, this has problems of high viscosity and wettability to a separator. Thus, other solvents with a low boiling point and a low dielectric constant have been mixed to be used as alternatives.

However, the alternative solvents still have the problem of the swelling phenomenon at a high temperature.

SUMMARY OF THE INVENTION

The present invention provides an electrolyte for a lithium secondary battery and a lithium secondary battery comprising the same, which employs an electrolyte comprising a cyclic ester, an organic solvent including a nitrile-containing solvent at a content ranging from 1 to 5% by volume based on the total volume of the cyclic ester and the nitrile-containing solvent, and a lithium salt so that the lithium secondary battery has an excellent swelling phenomenon and excellent discharge capacity at a low temperature.

According to an aspect of the present invention, an electrolyte for a lithium secondary battery includes: a cyclic ester; an organic solvent including a nitrile-containing solvent represented by the following Formula 1 at a content ranging from of 1 to 5% by volume based on the total volume of the cyclic ester and the nitrile-containing solvent; and a lithium salt.

$$R\text{—}C\!\!\equiv\!\!N, \quad\quad [\text{Formula 1}]$$

wherein R is selected, from the group consisting of a $C_1$ to $C_{10}$ aliphatic hydrocarbon, a $C_1$ to $C_{10}$ halogenated aliphatic hydrocarbon, a $C_6$ to $C_{10}$ aromatic hydrocarbon, and a $C_6$ to $C_{10}$ halogenated aromatic hydrocarbon.

According to another aspect of the present invention, a lithium secondary battery includes: an electrolyte including a cyclic ester, an organic solvent including a nitrile-containing solvent represented by Formula 1 at a content ranging from 1 to 5% by volume based on the total volume of the cyclic ester and the nitrile-containing solvent, and a lithium salt; a positive electrode containing a positive electrode active material which can intercalate/deintercalate lithium; and a negative electrode containing a negative electrode active material which can intercalate/deintercalate lithium.

$$R\text{—}C\!\!\equiv\!\!N, \quad\quad [\text{Formula 1}]$$

wherein R is selected from the group consisting of a $C_1$ to $C_{10}$ aliphatic hydrocarbon, a $C_1$ to $C_{10}$ halogenated aliphatic hydrocarbon, a $C_6$ to $C_{10}$ aromatic hydrocarbon, and a $C_6$ to $C_{10}$ halogenated aromatic hydrocarbon.

In an embodiment of the present invention, the nitrile-containing solvent represented by Formula 1 may be formed of at least one selected from the group consisting of acetonitrile, propionitrile, butyronitrile, t-butyl cyanide, valeronitrile, caprylonitrile or heptyl cyanide, heptanenitrile, cyclopentane carbonitrile, cyclohexane carbonitrile, 2-fluorobenzonitrile, 4-fluorobenzonitrile, difluorobenzonitrile, trifluorobenzonitrile, 2-chlorobenzonitrile, 4-chlorobenzonitrile, dichlorobenzonitrile, trichlorobenzonitrile, 2-chloro-4-fluorobenzonitrile, 4-chloro-2-fluorobenzonitrile, phenylacetonitirle, 2-fluorophenylacetonitrile, and 4-fluorophenylacetonitrile.

Also, the nitrile-containing solvent represented by Formula 1 may be formed of cyclohexane carbonitrile.

DETAILED DESCRIPTION OF THE INVENTION

The above and other objects, features and functions of the present invention will be described more fully with exemplary embodiments of the present invention.

According to an embodiment of the present invention, an electrolyte includes a cyclic ester, a solvent containing a nitrile-containing solvent, and a lithium salt.

The electrolyte according to embodiments of the present invention improves swelling characteristics at a high temperature and battery's performance.

The nitrile-containing solvent is a compound represented by Formula 1.

[Formula 1]

wherein R is selected from the group consisting of a $C_1$ to $C_{10}$ aliphatic hydrocarbon, a $C_1$ to $C_{10}$ halogenated aliphatic hydrocarbon, a $C_6$ to $C_{10}$ aromatic hydrocarbon, and a $C_6$ to $C_{10}$ halogenated aromatic hydrocarbon.

That is, in Formula 1, R is an aliphatic hydrocarbon or halogenated aliphatic hydrocarbon of 1 to 10 carbon atoms, or an aromatic hydrocarbon or halogenated aromatic hydrocarbon of 6 to 10 carbon atoms, preferably an aliphatic hydrocarbon or halogenated aliphatic hydrocarbon of 3 to 8 carbon atoms, and more preferably an aliphatic hydrocarbon or halogenated aliphatic hydrocarbon of 5 to 8 carbon atoms. The more alkyl groups the hydrocarbon has, the higher its boiling point will be, and thus the hydrocarbon becomes more stabilized. Also, the aliphatic hydrocarbon is less decomposed than the aromatic hydrocarbon, and thus is more preferable. In Formula 1, if R is an unsaturated hydrocarbon, for example, methacrylate, it may not be desirable as a solvent for the electrolyte.

An exemplary nitrile-containing solvent of Formula 1 may be formed of at least one selected from the group consisting of acetonitrile, propionitrile, butyronitrile, t-butyl cyanide, valeronitrile, caprylonitrile or heptylcyanide, heptanenitrile, cyclopentane carbonitrile, cyclohexane carbonitrile, 2-fluorobenzonitrile, 4-fluorobenzinitrile, difluorobenzonitrile, trifluorobenzonitrile, 2-chlorobenzonitrile, 4-chlorobenzonitrile, dichlorobenzonitrile, trichlorobenzonitrile, 2-chloro-4-fluorobenzonitrile, 4-chloro-2-fluorobenzonitrile, phenylacetonitrile, 2-fluorophenylacetonitrile, and 4-fluorophenylacetonitrile.

In the electrolyte of the embodiment of the present invention, the cyclic ester is contained at a content ranging from 95 to 99% by volume based on the total volume of the cyclic ester and the nitrile-containing solvent, and the nitrile-containing solvent is contained at a content ranging from 1 to 5% by volume based on the total volume of the cyclic ester and the nitrile-containing solvent. Also, the cyclic ester may be contained in the electrolyte at a content ranging from 96 to 99% by volume based on the total volume of the cyclic ester and the nitrile-containing solvent, and the nitrile-containing solvent may be contained in the electrolyte at a content ranging from 1 to 4% by volume based on the total volume of the cyclic ester and the nitrile-containing solvent. When the content of the nitrile-containing solvent is lower than 1% by volume, a swelling phenomenon of the battery occurs, whereas when the content of the nitrile-containing solvent is higher than 5% by volume, discharge capacity at a low temperature is unexpectedly, drastically reduced. Also, when the content of the cyclic ester is lower than 95% by volume, the performance of the battery deteriorates, whereas when the content of the cyclic ester is higher than 99% by volume, there are problems of wettability to a separator and poor performance of the battery.

The electrolyte according to an embodiment of the present invention may further include a linear ester. Here, the content of the linear ester may be higher than 0 and lower than 70 parts by volume based on 100 parts by volume of the total cyclic ester and the nitrile-containing solvent. When the content of the linear ester is higher than 70 parts by volume based on the total volume thereof, the swelling phenomenon of the battery occurs.

Examples of the cyclic ester include, but are not limited to, at least one selected from the group consisting of ethylene carbonate, propylene carbonate, butylene carbonate, γ-butyrolactone, γ-valerolactone, γ-caprolactone, δ-valerolactone, and ∈-caprolactone.

Examples of the linear ester include, but are not limited to, at least one selected from the group consisting of dimethyl carbonate, ethyl methyl carbonate, diethyl carbonate, dipropyl carbonate, dibutyl carbonate, methyl acetate, ethyl acetate, methyl hexanoate, methyl formate, and a mixture thereof.

Also, the electrolyte according to the embodiment of the present invention may further include an additive. The additive may include a carbonate derivative with a substituent such as halogen, a cyano (CN) group and a nitro ($NO_2$) group, vinylene carbonate, divinylsulfone, or ethylene sulfite. With such an additive, the battery may have an excellent swelling phenomenon at a high temperature, and excellent electrochemical characteristics such as capacity, life span and low-temperature characteristics. This additive may include an ethylene carbonate derivative represented by the following Formula 2, and more preferably, fluoroethylene carbonate.

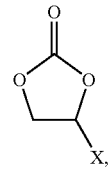
[Formula 2]

wherein X is selected from the group consisting of halogen, a cyano (CN) group and a nitro ($NO_2$) group.

The additive is added at a content ranging from 0.1 to 10 parts by weight based on 100 parts by weight of the total electrolyte. When the additive is used at a content of lower than 0.1 parts by weight, it is difficult to prevent gas generation in the battery, whereas when the additive is used at a content of higher than 10 parts by weight, the life span is reduced and the swelling phenomenon occurs at a high temperature.

The lithium salt serves as a source of a lithium ion in the battery, and thus enables the lithium battery to perform a basic operation. The lithium salt may include $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(C_yF_{2x+1}SO_2)$ (herein, x and y are natural numbers), $LiSO_3CF_3$, or a mixture thereof.

The lithium salt may be used at a concentration ranging from 0.6 to 2.0M, and preferably from 0.7 to 1.6M. When the concentration of the lithium salt is lower than 0.6M, conduction of the electrolyte becomes lower, and thus the performance of the electrolyte deteriorates. Otherwise, when the concentration thereof is higher than 2.0M, the electrolyte's viscosity increases and thus the mobility of the lithium ion decreases.

The lithium secondary battery including the electrolyte of the embodiments of the present invention includes a positive electrode and a negative electrode.

The positive electrode includes a positive electrode active material which can reversibly intercalate and deintercalate lithium ions. Lithium-transition metal oxide, such as $LiCoO_2$, $LiNiO_2$, $LiMnO_2$, $LiMn_2O_4$, or $LiNi_{1-x-y}Co_xM_yO_2$ ($0 \leq x \leq 1$, $0 \leq y \leq 1$, $0 \leq x+y \leq 1$, and M is metal such as Al, Sr, Mg or La) can be used as the positive electrode active material.

The negative electrode includes a negative electrode active material which can intercalate and deintercalate lithium ions.

A carbon-based material such as crystalline or amorphous carbon, or a carbon complex can be used as the negative electrode active material.

The positive electrode active material and the negative electrode active material each are coated on each current collector of a thin film to a predetermined thickness and length, respectively, and wound with a separator which may be formed of a resin such as polyethylene or polypropylene as an insulator, or stacked so as to form a battery. Then, this is put into a metal can or a similar reservoir and the electrolyte of the embodiments of the present invention is injected, and thus the lithium secondary battery is produced.

Examples and Comparative Examples of the present invention will be described below. These examples, however, should not in any sense be interpreted as limiting the scope of the present invention

EXAMPLE 1

0.5% by volume cyclohexane carbonitrile was mixed with a solution of ethylene carbonate, ethyl methyl carbonate and diethyl carbonate mixed in a volume ratio of 1:1:1, 3% by weight fluoroethylene carbonate was added, and $LiBF_4$ was dissolved at a concentration of 1.15M, and thus an electrolyte was prepared.

A lithium secondary battery was produced, which employs a positive electrode using $LiCoO_2$ as a positive electrode active material, a negative electrode using graphite as a negative electrode active material, and the electrolyte.

EXAMPLE 2

An electrolyte was prepared in accordance with the same procedure as in Example 1, except that 1% by volume cyclohexane carbonitrile was used instead of 0.5% by volume cyclohexane carbonitrile.

EXAMPLE 3

An electrolyte was prepared in accordance with the same procedure as in Example 1, except that 2% by volume cyclohexane carbonitrile was used instead of 0.5% by volume cyclohexane carbonitrile.

EXAMPLE 4

An electrolyte was prepared in accordance with the same procedure as in Example 1, except that 3% by volume cyclohexane carbonitrile was used instead of 0.5% by volume cyclohexane carbonitrile.

EXAMPLE 5

An electrolyte was prepared in accordance with the same procedure as in Example 1, except that 4% by volume cyclohexane carbonitrile was used instead of 0.5% by volume cyclohexane carbonitrile.

EXAMPLE 6

An electrolyte was prepared in accordance with the same procedure as in Example 1 except that 5% by volume cyclohexane carbonitrile was used instead of 0.5% by volume cyclohexane carbonitrile.

COMPARATIVE EXAMPLE 1

An electrolyte was prepared in accordance with the same procedure as in Example 1, except that cyclohexane carbonitrile was not added.

COMPARATIVE EXAMPLE 2

An electrolyte was prepared in accordance with the same procedure as in Example 1, except that 6% by volume cyclohexane carbonitrile was used instead of 0.5% by volume cyclohexane carbonitrile.

The lithium batteries of Examples 1 to 6, and Comparative Examples 1 and 2 were charged for 3 hours in a constant current-constant voltage (CC-CV) mode with a voltage of 4.2V at a charge/discharge rate of 0.5C, and then their standard capacities were measured. Then, the batteries were discharged in a CC mode with a voltage of 3V at a charge/discharge rate of 1C, and reduction rates of 300-cycle capacity were measured on the basis of the standard capacity. After the batteries were charged for 3 hours in a CC-CV mode with a voltage of 4.2V at a charge/discharge rate of 0.5C, placed at 0° C. for 3 hours, and discharged in a CC mode with a voltage of 3V at a charge/discharge rate of 1C, the reduction rates of the discharge capacity at a low temperature were measured on the basis of the standard capacity. Also, after the batteries were charged for 3 hours in a CC-CV mode with a voltage of 4.2V at a charge/discharge rate of 0.5C and placed in a 60° C. hot wind oven for 15 days, increasing rates of a thickness of the battery were measured.

The measurement results are shown in Table 1 below.

TABLE 1

| | Standard capacity | 300-cycle capacity (%) | Low-temperature discharge capacity (%) | Increasing rate of thickness (%) |
|---|---|---|---|---|
| Example 1 | 100 | 100 | 82 | 23 |
| Example 2 | 100 | 100 | 81 | 20 |
| Example 3 | 100 | 100 | 80 | 17 |
| Example 4 | 100 | 98 | 79 | 15 |
| Example 5 | 100 | 97 | 78 | 13 |
| Example 6 | 100 | 96 | 77 | 10 |
| Comparative Example 1 | 100 | 100 | 83 | 30 |
| Comparative Example 2 | 100 | 94 | 73 | 9 |

From the results shown in Table 1, it may be noted that the increasing rates of the thicknesses of Examples 1 to 6 were lower than that of Comparative Example 1 which has no cyclohexane carbonitrile, and thus the swelling phenomenon was improved. More specifically, as shown in Examples 1 to 6 and Comparative Example 2, it may be noted that as the % by volume of cyclohexane carbonitrile was higher, the swelling characteristics were improved.

However, as seen from Examples 1 to 6, and Comparative Examples 1 and 2, it may be noted that, as the content of the added cyclohexane carbonitrile was higher than 5% by volume, 300-cycle capacity was reduced to 94%, but the low-temperature discharge capacity was significantly reduced to 73%.

That is, it may be noted that, when the content of the added cyclohexane carbonitrile exceeds 5% by volume, the swelling phenomenon is effectively suppressed, but the low-temperature discharge capacity was unexpectedly, significantly reduced. That is, in Examples 1 to 6, the low-temperature discharge capacity is approximately linearly decreased according to the increase of the amount of the nitrile-containing solvent, but when the amount of the nitrile-containing solvent is more than 5% by volume, as shown in Comparative Example 2, the low-temperature discharge capacity is unexpectedly, significantly reduced. Accordingly, the content of the nitrile-containing solvent is critical to achieve a lithium secondary battery with the improved low-temperature discharge capacity.

In result, in an embodiment of the present invention, the content of the nitrile-containing solvent may be in a range from 1 to 5% by volume.

In an embodiment of the present invention, an electrolyte for a lithium secondary battery and a lithium secondary battery including the same include a nitrile-containing solvent at a content ranging from 1 to 5% by volume, thereby maintaining discharge capacity at a low temperature, improving swelling characteristics, and having better capacity, life span, etc., as compared to a conventional carbonate-containing electrolyte.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. An electrolyte for a lithium secondary battery, comprising:
    a cyclic ester;
    an organic solvent comprising a nitrile-containing solvent represented by the following Formula (1) at a content ranging from 1 to 4% by volume based on the total volume of the cyclic ester and the nitrile-containing solvent:

wherein R is selected from the group consisting of a $C_1$ to $C_{10}$ aliphatic hydrocarbon, a $C_1$ to $C_{10}$ halogenated aliphatic hydrocarbon, a $C_6$ to $C_{10}$ aromatic hydrocarbon, and a $C_6$ to $C_{10}$ halogenated aromatic hydrocarbon; and
    a lithium salt.

2. The electrolyte according to claim 1, wherein the nitrile-containing solvent comprises at least one selected from the group consisting of acetonitrile, propionitrile, butyronitrile, t-butyl cyanide, valeronitrile, caprylonitrile or heptyl cyanide, heptanenitrile, cyclopentane carbonitrile, cyclohexane carbonitrile, 2-fluorobenzonitrile, 4-fluorobenzonitrile, difluorobenzonitrile, trifluorobenzonitrile, 2-chlorobenzonitrile, 4-chlorobenzonitrile, dichlorobenzonitrile, trichlorobenzonitrile, 2-chloro-4-flourobenzonitrile, 4-chloro-2-fluorobenzonitrile, phenylacetonitirle, 2-fluorophenylacetonitrile, and 4-fluorophenylacetonitrile.

3. The electrolyte according to claim 1, wherein the nitrile-containing solvent comprises cyclohexane carbonitrile.

4. The electrolyte according to claim 1, wherein the electrolyte comprises the cyclic ester at a content ranging from 95 to 99% by volume, based on the total volume of the cyclic ester and the nitrile-containing solvent.

5. The electrolyte according to claim 1, wherein the cyclic ester comprises at least one selected from the group consisting of ethylene carbonate, propylene carbonate, butylene carbonate, γ-butyrolactone, γ-valerolactone, γ-caprolactone, δ-valerolactone, ε-caprolactone, and a mixture thereof.

6. The electrolyte according to claim 1, wherein the electrolyte further comprises a linear ester at a content of greater than 0 and not more than 70 parts by volume based on 100 parts by volume of the total cyclic ester and the nitrile-containing solvent.

7. The electrolyte according to claim 6, wherein the linear ester comprises at least one selected from the group consisting of dimethyl carbonate, ethyl methyl carbonate, diethyl carbonate, dipropyl carbonate, dibutyl carbonate, methyl acetate, ethyl acetate, methyl hexanoate, methyl formate, and a mixture thereof.

8. The electrolyte according to claim 1, wherein the lithium salt comprises at least one selected from the group consisting of $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(C_yF_{2x+1}SO_2)$ (herein, x and y are natural numbers), $LiSO_3CF_3$, and a mixture thereof.

9. The electrolyte according to claim 1, further comprising:
    an additive selected from the group consisting of a carbonate derivative having a substituent selected from the group consisting of halogen, a cyano (CN) group and a nitro ($NO_2$) group, vinylene carbonate, divinylsulfone, and ethylene sulfite.

10. The electrolyte according to claim 9, wherein the additive comprises an ethylene carbonate derivative represented by Formula (2):

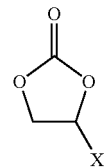

wherein X is selected from the group consisting of halogen, a cyano (CN) group, and a nitro ($NO_2$) group.

11. The electrolyte according to claim 9, wherein the additive comprises fluoroethylene carbonate.

12. The electrolyte according to claim 9, wherein the additive is added at a content ranging from 0.1 to 10 parts by weight based on 100 parts by weight of the total electrolyte.

13. A lithium secondary battery, comprising:
    a positive electrode containing a positive electrode active material which can intercalate and deintercalate lithium;
    a negative electrode containing a negative electrode active material which can intercalate and deintercalate lithium; and
    an electrolyte comprising a cyclic ester, an organic solvent containing a nitrile-containing solvent represented by the following Formula (1) at a content ranging from 1 to 4% by volume based on the total volume of the cyclic ester and the nitrile-containing solvent, and a lithium salt:

wherein R is selected from the group consisting of a $C_1$ to $C_{10}$ aliphatic hydrocarbon, a $C_1$ to $C_{10}$ halogenated aliphatic hydrocarbon, a $C_6$ to $C_{10}$ aromatic hydrocarbon, and a $C_6$ to $C_{10}$ halogenated aromatic hydrocarbon.

14. The battery according to claim 13, wherein the nitrile-containing solvent comprises at least one selected from the group consisting of acetonitrile, propionitrile, butyronitrile, t-butyl cyanide, valeronitrile, caprylonitrile or heptyl cyanide, heptanenitrile, cyclopentane carbonitrile, cyclohexane carbonitrile, 2-fluorobenzonitrile, 4-fluorobenzonitrile, difluorobenzonitrile, trifluorobenzonitrile, 2-chlorobenzonitrile, 4-chlorobenzonitrile dichlorobenzonitrile, trichlorobenzonitrile, 2-chloro-4-flourobenzonitrile, 4-chloro-2-fluorobenzonitrile, phenylacetonitirle, 2-fluorophenylacetonitrile, and 4-fluorophenylacetonitrile.

15. The battery according to claim 13, wherein the nitrile-containing solvent comprises cyclohexane carbonitrile.

16. The battery according to claim 13, wherein the electrolyte comprises the cyclic ester at a content ranging from 95 to 99% by volume, based on the total volume of the cyclic ester and the nitrile-containing solvent.

17. The battery according to claim 13, wherein the cyclic ester comprises at least one selected from the group consisting of ethylene carbonate, propylene carbonate, butylene carbonate, γ-butyrolactone, γ-valerolactone, γ-caprolactone, δ-valerolactone, ε-caprolactone, and a mixture thereof.

18. The battery according to claim 13, wherein the electrolyte further comprises a linear ester at a content of greater than 0 and not more than 70 parts by volume based on the 100 parts by volume of the total cyclic ester and the nitrile-containing solvent.

19. The battery according to claim 18, wherein the linear ester comprises at least one selected from the group consisting of dimethyl carbonate, ethyl methyl carbonate, diethyl carbonate, dipropyl carbonate, dibutyl carbonate, methyl acetate, ethyl acetate, methyl hexanoate, methyl formate, and a mixture thereof.

20. The battery according to claim 13, wherein the lithium salt comprises at least one selected from the group consisting of $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(C_yF_{2x+1}SO_2)$ (herein, x and y are natural numbers), $LiSO_3CF_3$, and a mixture thereof.

21. The battery according to claim 13, wherein the electrolyte further comprises an additive selected from the group consisting of a carbonate derivative with a substituent selected from the group consisting of halogen, a cyano (CN) group and a nitro ($NO_2$) group. vinylene carbonate, divinylsulfone, and ethylene sulfite.

22. The battery according to claim 21, wherein the additive comprises an ethylene carbonate derivative represented by Formula (2):

(2)

wherein X is selected from the group consisting of halogen, a cyano (CN) group, and a nitro ($NO_2$) group.

23. The battery according to claim 21, wherein the additive comprises fluoroethlyene carbonate.

24. The battery according to claim 21, wherein the additive is added at a content ranuing from 0.1 to 10 parts by weight based on 100 parts by weight of the total electrolyte.

* * * * *